US011982182B1

(12) United States Patent
He et al.

(10) Patent No.: US 11,982,182 B1
(45) Date of Patent: May 14, 2024

(54) DEVICES AND METHODS FOR TESTING RETROGRADE CONDENSATION DAMAGE IN NEAR WELL ZONES OF CONDENSATE GAS RESERVOIRS WITH HIGH CONDENSATE CONTENT

(71) Applicant: SOUTHWEST PETROLEUM UNIVERSITY, Sichuan (CN)

(72) Inventors: Youwei He, Chengdu (CN); Shuai Qiu, Chengdu (CN); Jiazheng Qin, Chengdu (CN); Yong Tang, Chengdu (CN); Keji Long, Chengdu (CN); Zhenhua Rui, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/523,833

(22) Filed: Nov. 29, 2023

(30) Foreign Application Priority Data

Dec. 15, 2022 (CN) .................. 202211609535.X

(51) Int. Cl.
E21B 49/00 (2006.01)
E21B 49/08 (2006.01)
G01N 15/08 (2006.01)

(52) U.S. Cl.
CPC ....... E21B 49/087 (2013.01); G01N 15/0826 (2013.01)

(58) Field of Classification Search
CPC ........ E21B 49/00; E21B 49/08; E21B 49/087; G01N 15/00; G01N 15/08; G01N 15/0826

See application file for complete search history.

(56) References Cited

U.S. PATENT DOCUMENTS 11,851,965 B2 * 12/2023 Westacott ............ G01N 1/2202

FOREIGN PATENT DOCUMENTS

| CN | 106596371 A | 4/2017 |
| CN | 107288590 A | 10/2017 |
| CN | 110530768 A | 12/2019 |
| CN | 110879196 | 3/2020 |
| CN | 113189309 | 7/2021 |

(Continued)

OTHER PUBLICATIONS

Machine Translation of CN-116735835-A (Year: 2023).*

(Continued)

Primary Examiner — Nguyen Q. Ha
(74) Attorney, Agent, or Firm — PORUS IP LLC

(57) ABSTRACT

Methods and systems for testing retrograde condensation damage in a near well zone of a condensate gas reservoir with a high condensate content are provided. The device comprises a long rock core holder, a first two-way valve, a second two-way valve, a first single-way valve, a second single-way valve, a third single-way valve, a fourth single-way valve, a first three-way valve, a second three-way valve, a third three-way valve, a confining pressure pump, a confining pressure gauge, a vacuum pump, a high-pressure high-precision displacement pump, a first intermediate container, an outlet pressure gauge, a displacement pump, a back pressure valve, a gas meter, a second intermediate container, an inlet pressure gauge, a test tube, a constant temperature oven, a gas flowmeter, a gas chromatograph, a six-way valve, a sample preparation device, and a thermostatic chamber.

9 Claims, 3 Drawing Sheets

(56) References Cited

FOREIGN PATENT DOCUMENTS

| CN | 115078356 | 9/2022 | | |
|----|-----------|--------|---|---|
| CN | 115219739 | 10/2022 | | |
| CN | 116735835 A | * | 9/2023 | ......... G01N 15/0826 |

OTHER PUBLICATIONS

Wang, Shaofei et al., A New Cognition of The Reduction of Retrograde Condensation Damage In Gas Condensate Wells By Fracturing, Reservoir Evaluation and Development, (8) 2: 30-34, 2018.
Zou, Chunmei et al., The Evaluation Methods And Application Of Retrograde Condensation Damage In Condensate Gas Reservoir, Reservoir Evaluation and Development, (9) 6: 30-34, 41, 2019.
Wang, Zhouhua et al., Experimental Research of Condensate Blockage And Mitigating Effect of Gas Injection, Petroleum, (4) 3: 292-299, 2018.
Decision to Grant a Patent in Chinese Application No. 202211609535.X dated Jun. 30, 2023, 5 pages.

* cited by examiner

DEVICES AND METHODS FOR TESTING RETROGRADE CONDENSATION DAMAGE IN NEAR WELL ZONES OF CONDENSATE GAS RESERVOIRS WITH HIGH CONDENSATE CONTENT

CROSS-REFERENCE TO RELATED APPLICATION

This application claims priority to Chinese Application No. 202211609535.X, filed on Dec. 15, 2022, the entire contents of which are hereby incorporated by reference.

TECHNICAL FIELD

The present disclosure relates to the technical field of retrograde condensation damage evaluation of condensate field development, and in particular, relates to devices and methods for testing retrograde condensation damage in a near well zone of a condensate gas reservoir with a high condensate content.

BACKGROUND

In the development process of condensate gas reservoirs, when a reservoir pressure is lower than a dew point pressure, condensate gas may undergo retrograde condensate, part of heavy components may be precipitated, and the precipitated condensate may block reservoir pores, which leads to weakening of the gas-phase seepage capacity. Especially, for the condensate gas reservoir with high condensate content, a permeability damage degree caused by retrograde condensation during pressure reduction is often significant, which seriously affects the production capacity. Therefore, it is of great significance to evaluate the retrograde condensation damage degree of the condensate gas reservoirs in the development process for efficient development of condensate fields.

Currently, the manner for testing retrograde condensation damage during the depletion development of the condensate gas reservoirs mainly includes injecting equilibrium gas at different depletion pressures into a long rock core at corresponding depletion pressures, recording the stable pressures and flow rates at an inlet end and an outlet end, and calculating a permeability at the corresponding pressures using Darcy formula. The test manner does not take into account a condensate phase separated after the equilibrium gas passes through the long rock core and does not take into account a temperature change, so the permeability damage degree obtained by the test manner has a low accuracy.

Therefore, it is desirable to provide devices and methods for testing retrograde condensation damage in a near well zone of a condensate gas reservoir with high a condensate content to improve the accuracy of retrograde condensation damage testing in the process of the condensate gas reservoir depletion development.

SUMMARY

One or more embodiments of the present disclosure provide a device for testing retrograde condensation damage in a near well zone of a condensate gas reservoir with a high condensate content. The device includes a long rock core holder, a first two-way valve, a second two-way valve, a first single-way valve, a second single-way valve, a third single-way valve, a fourth single-way valve, a first three-way valve, a second three-way valve, a third three-way valve, a confining pressure pump, a confining pressure gauge, a vacuum pump, a high-pressure high-precision displacement pump, a first intermediate container, an outlet pressure gauge, a displacement pump, a back pressure valve, a gas meter, a second intermediate container, an inlet pressure gauge, a test tube, a constant temperature oven, a gas flowmeter, a gas chromatograph, a six-way valve, a sample preparation device, and a thermostatic chamber. The high-pressure high-precision displacement pump, the sample preparation device, the second intermediate container, and the first intermediate container are all connected to the six-way valve. The second intermediate container, the first intermediate container, and the six-way valve are located inside the constant temperature oven. The third three-way valve is connected to the long rock core holder. The first single-way valve is connected to the sample preparation device and is also connected to the third three-way valve through the first three-way valve and the second three-way valve. The second single-way valve is connected to the second intermediate container and is also connected to the third three-way valve through the first three-way valve and the second three-way valve. The third single-way valve is connected to the first intermediate container and is also connected to the third three-way valve through the second three-way valve. The inlet pressure gauge, the confining pressure gauge, the outlet pressure gauge, the first two-way valve, and the fourth single-way valve are all connected to the long rock core holder and are located inside the constant temperature oven. The vacuum pump is connected to the third three-way valve and is located outside the constant temperature oven. The confining pressure pump is connected to the first two-way valve and is located outside the constant temperature oven. The back pressure valve, the gas flowmeter, and the test tube are connected in sequence and are all located inside the thermostatic chamber. The back pressure valve is connected to the fourth single-way valve. The second two-way valve is connected to the back pressure valve and is located inside the thermostatic chamber. The displacement pump is connected to the second two-way valve and is located outside the thermostatic chamber. The gas meter is connected to the test tube and is located outside the thermostatic chamber. The gas chromatograph is connected to the gas meter and is located outside the thermostatic chamber.

One of the embodiments of the present disclosure provides a method for testing retrograde condensation damage in a near well zone of a condensate gas reservoir with a high condensate content. The method includes: S1, developing pressure points for different permeability testing experiments; S2, evacuating a long rock core in the long rock core holder; S3, obtaining a first test long rock core by establishing an original formation irreducible water saturation, an original formation pressure condition, and an original formation temperature condition in the long rock core after evacuation; S4, obtaining a first permeability result by testing a permeability of the first test long rock core; S5, obtaining a second test long rock core by establishing an original formation fluid condition in the first test long rock core; S6, obtaining a second permeability result by testing, based on the pressure points, a permeability change of the second test long rock core at different depletion pressure points; S7, obtaining a third test long rock core by recovering a condensate gas reservoir fluid of the second test long rock core; and S8, obtaining a third permeability result by testing a permeability change of the third test long rock core and plotting a permeability damage degree curve.

BRIEF DESCRIPTION OF THE DRAWINGS

The present disclosure is further illustrated in terms of exemplary embodiments. These exemplary embodiments

DETAILED DESCRIPTION

Figure 1:
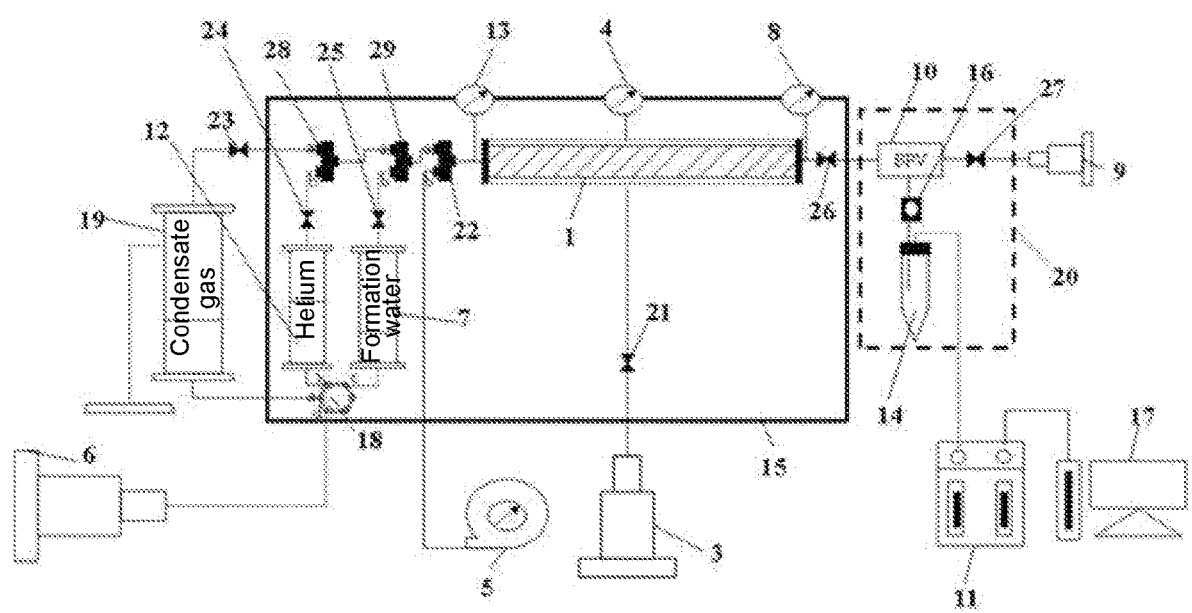
FIG. 1 is an exemplary schematic structure diagram of a device for testing retrograde condensation damage in a near well zone of a condensate gas reservoir with a high condensate content according to some embodiments of the present disclosure.

In order to more clearly illustrate the technical solutions of the embodiments of the present disclosure herein, the accompanying drawings required to be used in the description of the embodiments are briefly described below. Obviously, the accompanying drawings in the following description are only some examples or embodiments of the present disclosure, and a person of ordinary skill in the art may apply the embodiments disclosed herein to other similar scenarios without creative labor based on these drawings. The present disclosure may be applied to other similar scenarios without creative labor based on the drawings. Unless clearly evident from the language context or otherwise stated, the same numbered reference in the drawings represents the same structure or operation.

It should be understood that the terms "system", "device", "unit", and/or "module" as used herein are used to distinguish different components, elements, parts, sections, or assemblies at different levels. However, if other words achieve the same purpose, the terms may be replaced with other expressions.

As shown in this disclosure and the claims, except when the context clearly suggests otherwise, words such as "one," "a", "an", and/or "the" are not specifically limited to the singular form and may also include the plural. Generally, the terms "including" and "comprising" only indicate the inclusion of explicitly identified steps and elements. In general, the terms "including" and "comprising" only indicate the inclusion of explicitly identified steps and elements that do not constitute an exclusive list, and the method or apparatus may also include other steps or elements.

Flowcharts are used in the present disclosure to illustrate operations performed by a system in accordance with embodiments of the present disclosure. It should be appreciated that the preceding or following operations are not necessarily performed in a specific sequence. Instead, steps may be processed in reverse order or simultaneously. Also, it is possible to add other operations to these processes, or to remove a step or steps from these processes.

Currently, the manner for testing retrograde condensation damage during depletion development of a condensate gas reservoir mainly includes injecting equilibrium gas at different depletion pressures into a long rock core at corresponding depletion pressures, recording pressures and flow rates at an inlet end and an outlet end, and calculating a permeability at the corresponding pressures using Darcy formula. However, the manner has the following problems. The equilibrium gas is single-phase when flowing in the long rock core and separates into oil and gas phases when passing through the outlet. A gasometric permeability formula is derived based on isothermal flow, and an isothermal condition is needed in the testing process. However, in the actual testing process of the method for testing retrograde condensation damage, the separated oil phase and temperature changes are ignored, and the permeability is calculated only based on an outlet gas phase flow rate and the gasometric Darcy formula, which leads to a small test result of the permeability and an increased actual permeability damage degree. When the condensate gas reservoir is a condensate gas reservoir with high condensate content, the error may be further increased, which affects the accuracy of the test.

In view of this, in some embodiments of the present disclosure, a device for testing retrograde condensation damage in a near well zone of a condensate gas reservoir with high condensate content is provided. The device includes a long rock core holder, a plurality of valves, a confining pressure pump, a confining pressure gauge, a vacuum pump, a high-pressure high-precision displacement pump, a first intermediate container, an outlet pressure gauge, a displacement pump, a back pressure valve, a gas meter, a second intermediate container, an inlet pressure gauge, a test tube, a constant temperature oven, a gas flowmeter, a gas chromatograph, a six-way valve, a sample preparation device, and a constant temperature oven. A plurality of permeability results may be obtained by conducting various permeability tests on the long rock core using the device, a permeability damage degree curve is calculated and plotted, and the permeability damage is evaluated, which improves the accuracy of the method testing for retrograde condensation damage in the process of depletion development of the condensate gas reservoir.

FIG. 1 is an exemplary structural diagram of a device for testing retrograde condensation damage in a near well zone of a condensate gas reservoir with a high condensate content according to some embodiments of the present disclosure. Some embodiments described below may be understood with reference to FIG. 1. However, the accompanying drawings are only illustrative of some embodiments and do not limit the embodiments.

In some embodiments, as shown in FIG. 1, the device for testing retrograde condensation damage in a near well zone of a condensate gas reservoir with a high condensate content includes the long rock core holder 1, a plurality of valves, the confining pressure pump 3, the confining pressure gauge 4, the vacuum pump 5, the high-pressure high-precision displacement pump 6, the first intermediate container 7, the outlet pressure gauge 8, the displacement pump 9, the back pressure valve 10, the gas meter 11, the second intermediate container 12, the inlet pressure gauge 13, the test tube 14, the constant temperature oven 15, the gas flowmeter 16, the gas chromatograph 17, the six-way valve 18, the sample preparation device 19, and the constant temperature oven 20. In some embodiments, the plurality of valves includes the first two-way valve 21, the second two-way valve 26, the first single-way valve 23, the second single-way valve 24, the third single-way valve 25, the fourth single-way valve 26, the first three-way valve 28, the second three-way valve 29, and the third three-way valve 22.

The long rock core holder 1 refers to a device used to hold and protect a long rock core and seal a cylindrical surface or an end surface of the long rock core. The long rock core refers to a rock sample that is obtained from an underground rock formation using a drill bit or other coring tools as required. The long rock core usually has a long length (more than 20 cm) and a relatively small diameter. The long rock core may also be made up of multiple short rock samples spliced together. In some embodiments, the long rock core holder 1 may simulate a formation condition, such as a formation pressure, a formation temperature, and a flow pattern of a formation fluid. A relevant parameter (e.g., a porosity, a permeability, or a saturation) of the long rock core may be obtained by measuring the temperature, pressure, and flow rate inside the long rock core holder 1, thereby providing a scientific basis for oil field exploration and development.

The plurality of valves are used to control the movement or opening and closing of fluids (e.g., helium or formation water) between different channels. In some embodiments, the back pressure valve 10 refers to a value used to control a back pressure of the long rock core. The back pressure refers to a static pressure at the pore fluid of the long rock core.

The confining pressure pump 3 is used to provide a confining pressure to the long rock core holder 1. The confining pressure refers to a pressure that constrains the long rock core holder 1. The confining pressure may simulate constraints in the groundwater or underground formation. In some embodiments, the confining pressure pump 3 may be a pump capable of applying a constrain pressure, for example, a hydraulic pump, a pneumatic pump, or a peristaltic pump. The vacuum pump 5 refers to a pump used to generate or maintain a vacuum state. The vacuum pump 5 may include, but is not limited to, a centrifugal pump, a screw vacuum pump, etc.

The high-pressure high-precision displacement pump 6 refers to a device used for fluid drive and displacement operations. Example displacement manners include, but are not limited to, that the high-pressure high-precision displacement pump 6 may drive helium in the second intermediate container 12 to the long rock core and replace the formation water in the long rock core with the helium to complete the displacement of the formation water by the helium. The high-pressure high-precision displacement pump 6 includes, but is not limited to, a high-pressure piston pump, a peristaltic pump, a diaphragm pump, a micro pump, etc. The displacement pump 9 refers to a pump that controls pressure through fluid drive and displacement operations. In some embodiments, the displacement pump 9 provides the back pressure to the back pressure valve 10 by controlling the opening, closing, and the flow rate of the second two-way valve 27.

In some embodiments, the inlet pressure gauge 13 is located at an inlet of the long rock core holder 1 and used to test a pressure at the inlet of the long rock core holder 1. In some embodiments, the confining pressure gauge 4 is used to measure the confining pressure inside the long rock core holder 1, and the confining pressure pump 3 provides the confining pressure to the long rock core holder 1 through the first two-way valve 21. In some embodiments, the outlet pressure gauge 8 is located at an outlet of the long rock core holder 1 and used to measure a pressure at the outlet of the long rock core holder 1. In some embodiments, the gas flowmeter 16 is used to monitor a gas flow rate output from the outlet of the long rock core holder 1. The gas meter 11 is used to measure a produced gas volume at the outlet end of the long rock core. The gas chromatograph 17 is used to test composition of the gas.

In some embodiments, the first intermediate container 7 refers to a container used to store the formation water, for example, a small water tank. The second intermediate container 12 refers to a container used to store helium, for example, a gas cylinder or a liquid helium tank.

In some embodiments, the test tube 14 is used to collect the condensate separated from the condensate gas at the outlet end of the long rock core. The constant temperature oven 15 is a heating device that controls an ambient temperature inside the oven to make internal components of the oven 15 in a constant temperature state. The sample preparation device 19 is used to configure and store the condensate gas. The thermostatic chamber 20 is a heating device used to maintain the temperature of the components and the environment inside the chamber 20.

In some embodiments, as shown in FIG. 1, the high-pressure high-precision displacement pump 6, the sample preparation device 19, the second intermediate container 12, and the first intermediate container 7 are all connected to the six-way valve 18. The second intermediate container 12, the first intermediate container 7, and the six-way valve 18 are located inside the constant temperature oven 15. The third three-way valve 22 is connected to the long rock core holder 1. The first single-way valve 23 is connected to the sample preparation device 19. The first single-way valve 23 is also connected to the first three-way valve 28, the second three-way valve 29, and the third three-way valve 22 in turn. The second single-way valve 24 is connected to the second intermediate container 12 and is also connected to the first three-way valve 28. The third single-way valve 25 is connected to the first intermediate container 7 and is also connected to the second three-way valve 29. The inlet pressure gauge 13, the confining pressure gauge 4, the outlet pressure gauge 8, the first two-way valve 21, and the fourth single-way valve 26 are all connected to the long rock core holder 1 and are all located in the constant temperature oven 15. The vacuum pump 5 is connected to the third three-way valve 22 and is located outside the constant temperature oven 15. The confining pressure pump 3 is connected to the first two-way valve 21 and is located outside the constant temperature oven 15. The back pressure valve 10, the gas flowmeter 16, and the test tube 14 are connected in turn and are all located inside the thermostatic chamber 20. The back pressure valve 10 is also connected to the fourth single-way valve 26. The second two-way valve 27 is connected to the back pressure valve 10 and is located inside the thermostatic chamber 20. The displacement pump 9 is connected to the second two-way valve 27 and is located outside the thermostatic chamber 20. The gas meter 11 is connected to the test tube 14 and is located outside the thermostatic chamber 20. The gas chromatograph 17 is connected to the gas meter 11 and is located outside the thermostatic chamber 20.

In some embodiments, the high-pressure high-precision displacement pump 6 connected to a valve d of the six-way valve 18 respectively drives the condensate gas in the sample preparation device 19 connected to a valve a of the six-way valve 18, the helium in the second intermediate container 12 connected to a valve b of the six-way valve 18, and the formation water in the first intermediate container 7 connected to a valve c of the six-way valve 18. The formation water in the first intermediate container 7 flows into the long rock core holder 1 through the second three-way valve 29 and the third three-way valve 22. The sample preparation device 19, the second intermediate container 12, and the first intermediate container 7 are provided with the first single-way valve 23, the second single-way valve 24, and the third single-way valve 25, respectively, which avoids the backflow of the condensate gas, the helium, and the formation water.

In some embodiments, the device for testing retrograde condensation damage further includes a processor. In some embodiments, the processor may be communicatively connected to the component such as the long rock core holder 1, the plurality of valves, the confining pressure pump 3, the confining pressure gauge 4, the vacuum pump 5, the high-pressure high-precision displacement pump 6, the first intermediate container 7, the outlet pressure gauge 8, the displacement pump 9, the gas meter 11, the second intermediate container 12, the inlet pressure gauge 13, the constant temperature oven 15, the gas flowmeter 16, the gas chromatograph 17, the sample preparation device 19, or the thermostatic chamber 20.

The processor may be used to process data and/or information obtained from other devices or system components. The processor may execute program instructions based on such data, information, and/or processing results to perform one or more of the functions described herein. For example, the processor may be used to obtain a parameter such as temperature or pressure of the long rock core holder 1. In some embodiments, the processor may include one or more sub-processing devices (e.g., a single-core processing device or a multi-core processing device). Merely by way of example, the processor may include a Central Processing Unit (CPU), an Application-Specific Integrated Circuit (ASIC), or the like, or any combination thereof. More descriptions regarding the function of the processor may be found below.

Figure 2:
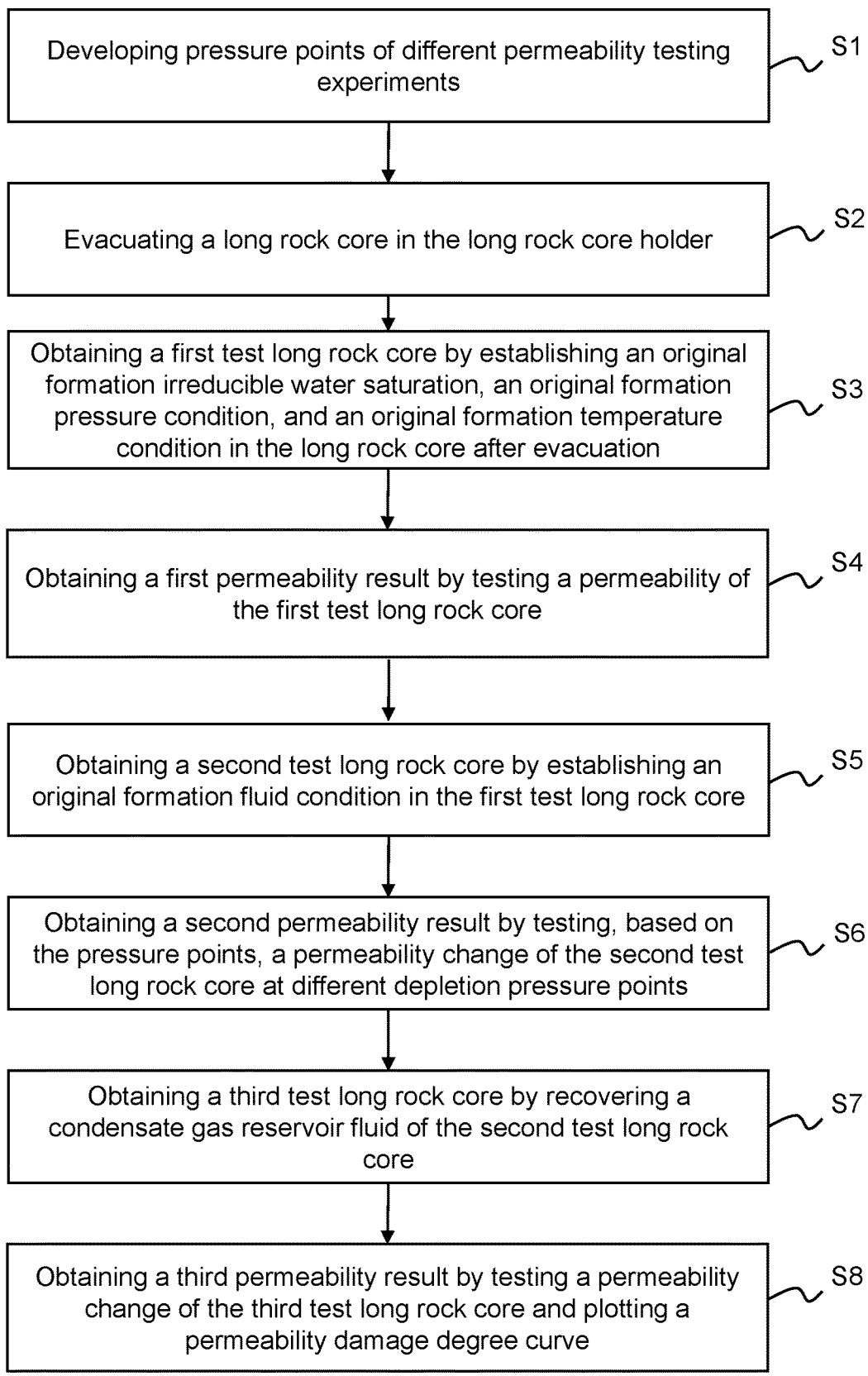
FIG. 2 is an exemplary flowchart of a method for testing retrograde condensation damage in a near well zone of a condensate gas reservoir with a high condensate content according to some embodiments of the present disclosure.

FIG. 2 is an exemplary flowchart of a method for testing retrograde condensation damage in a near well zone of a condensate gas reservoir with a high condensate content according to some embodiments of the present disclosure.

In some embodiments of the present disclosure, the method for testing retrograde condensation damage in a near well zone of a condensate gas reservoir with the high condensate content is also further provided. The method is implemented by a device for testing retrograde condensation damage in a near well zone of a condensate gas reservoir with the high condensate content. In some embodiments, the method for testing retrograde condensation damage includes evacuating an assembled long rock core in a long rock core holder; saturating the long rock core with formation water and displacing the formation water with helium to establish an irreducible water saturation; injecting helium into the long rock core to increase the pressure to a formation pressure and testing a gasometric permeability under the irreducible water saturation at an original formation temperature and pressure; displacing the helium with prepared condensate gas to establish an initial formation fluid state; reducing the back pressure to a certain pressure point below a dew point pressure of the condensate gas, after the pressure is stable, displacing the condensate gas with helium at the corresponding temperature and pressure until the composition of the produced gas tested at the outlet end is entirely helium, and after the flow rate of the outlet flowmeter is stable, recording the inlet pressure, the outlet pressure, and the outlet helium flow rate; calculating a gas permeability at the corresponding pressures; and after the test, displacing helium with condensate gas at the corresponding pressure condition in the sample preparation device 19 until the produced gas chromatogram composition at the outlet end is free of helium, continuing to reduce the back pressure to a next depletion pressure point, testing after the back pressure is stable until a last depletion pressure point is tested, and calculating and plotting a permeability damage degree curve to evaluate permeability damage.

In some embodiments, as shown in FIG. 2, the method for testing retrograde condensation damage includes operations S1 to S8.

In S1, developing pressure points for different permeability testing experiments.

In some embodiments, the pressure points for the different permeability testing experiments are developed, which may prepare for testing a permeability change of the long rock core under the action of retrograde condensate at different pressure points after pressure reduction in subsequent experiments. In some embodiments, a count of the pressure points is related to a difference between a dew point pressure and a limiting pressure of gas reservoir depletion exploitation. The larger the difference, the larger the count of the pressure points.

The dew point pressure refers to a pressure in the condensate gas corresponding to the liquefaction of the gas, which is also referred to as a saturation pressure. The limiting pressure of gas reservoir depletion exploitation refers to a minimum pressure to which a reservoir pressure drops and that fails to maintain industrial production when an oil and gas reservoir is exploited to a certain extent, which is also referred to as an exhaust pressure.

In some embodiments, the experimental pressure points may be determined based on a fixed preset interval. For example, the experimental pressure points are set at intervals of 3 MPa or 4 MPa. In other embodiments, the experimental pressure points may be determined based on a non-fixed preset interval. For example, the experimental pressure points may be set sequentially at intervals of 5 MPa, 4 MPa, 3 MPa, and 2 MPa from the dew point pressure.

In some embodiments, the experimental pressure points are determined based on the count of the pressure points, and the count of the pressure points may be determined according to equation (1). For example, the experimental pressure points are pressure points set at the fixed interval based on the count of the pressure points within a range from the dew point pressure to the limiting pressure of gas reservoir depletion exploitation.

$$n = (P_\beta - P_\alpha)/3 \tag{1}$$

where n denotes the count of the pressure points; $P_\beta$ denotes the dew point pressure and the unit is MPa; and $P_\alpha$ denotes the limiting pressure of gas reservoir depletion exploitation and the unit is MPa. When n≥4, the count of the pressure points is taken as [n]. When n<4, the count of the pressure points is taken as [n+1]. [ ] indicates taking an integer of a value in [ ].

In other embodiments, the experimental pressure points may also be obtained as follows. The processor is configured to determine the different permeability testing experimental pressure points based on current composition data, structure data of a long rock core to be tested, the dew point pressure, and the exhaust pressure.

The composition data of the long rock core refers to relevant data of composition that constitutes the long rock core to be tested, for example, chemical composition or mineral composition. The structure data of the long rock core refers to relevant data of a structure that constitutes the long rock core to be tested, for example, a crystal morphology, a crystal size, a density, a porosity, and a permeability of the long rock core. More descriptions regarding the dew point pressure and the exhaust pressure may be found above. The composition data of the long rock core may be obtained by conducting a composition analysis experiment on the long rock core. The structure data of the long rock core may be obtained by conducting an experimental test on the long rock core. The dew point pressure and the exhaust pressure may be obtained through experiments or historical empirical data.

In some embodiments, the device for testing retrograde condensation damage may also include an interactive terminal. The interactive terminal refers to a device or apparatus used for interacting with an operator. For example, the interactive terminal may include an interactive screen, a control panel, a smartphone, a tablet, etc. In some embodiments, the interactive terminal is communicatively connected to the processor. In some embodiments, the processor may obtain the composition data of the long rock core, the structure data of the long rock core, the dew point pressure, and the exhaust pressure inputted by the operator through the interactive terminal.

In some embodiments, the processor determines the different permeability testing experimental pressure points by querying a preset comparison table. The preset comparison table includes correspondences between the different long rock core composition data, long rock core structure data, dew point pressure, and exhaust pressure, and the different permeability testing experimental pressure points. The preset comparison table may be determined based on priori knowledge or historical data.

In some embodiments, the processor determining the different permeability testing experimental pressure points includes determining a preset experimental pressure interval based on an interval determination model and determining the experimental pressure points based on the preset experimental pressure interval.

In some embodiments, the interval determination model may be a machine learning model. In some embodiments, the interval determination model may include a Recurrent Neural Network (RNN), etc.

In some embodiments, an input of the interval determination model may include the composition data of the long rock core, the structure data of the long rock core, the dew point pressure, and the exhaust pressure, and an output of the interval determination model may be the preset pressure interval.

In some embodiments, the interval determination model may be obtained by training a plurality of training samples with labels. For example, the plurality of training samples with labels may be input into an initial interval determination model. A loss function may be constructed based on the labels and results of the initial interval determination model. Parameters of the initial interval determination model may be iteratively updated based on the loss function through a gradient descent manner or other manners. The model training is completed when a preset condition is met, and a trained interval determination model may be obtained. The preset condition may include convergence of the loss function, a count of iterations reaching a threshold, etc.

In some embodiments, the training sample(s) includes data such as sample long rock core composition data, sample long rock core structure data, a sample dew point pressure, and a sample exhaust pressure. The label(s) of the training sample(s) is an optimal pressure interval corresponding to the sample. In some embodiments, the training sample(s) may be obtained through experimental data. The label(s) may be obtained as follows. The operator obtains a plurality of retrograde condensation damage degree curves by performing retrograde condensation damage testing experiments on the long rock core of the same sample based on a plurality of retrograde condensation damage degree curves corresponding to different pressure intervals in the historical data or different pressure intervals in a plurality of experiments. The processor selects at least one curve of which a similarity to a final curve smaller than a threshold and takes a suitable interval of the pressure intervals corresponding to the selected curve as the optimal pressure interval(s).

The retrograde condensation damage degree curve refers to a curve formed by retrograde condensation damage degrees corresponding to a plurality of depletion pressures. The final curve refers to a retrograde condensation damage degree curve with a smallest pressure interval of the plurality of the retrograde condensation damage degree curves. The similarity refers to a degree to which shapes of two curves match, which may be determined through matching based on graphical descriptors, contour matching, feature point matching, etc. The suitable interval refers to a minimum or intermediate value of the pressure intervals corresponding to the at least one curve whose similarity is smaller than the threshold. The processor also selects a pressure interval corresponding to the final curve (i.e., the smallest pressure interval) as the optimal pressure interval in response to the similarity between the at least one curve and the final curve being greater than or equal to the threshold. Understandably, the smaller the pressure interval, the higher the accuracy of the retrograde condensation damage degree curve of the experiment corresponding to the pressure interval. However, the smaller the pressure interval, the more the experiments need to be performed, which increases consumption of resources and time. Therefore, the curve whose similarity to the final curve is smaller than the threshold is selected and the pressure interval corresponding to the curve is used as the corresponding label, which ensures that the retrograde condensation damage degree curve of the experiment is similar to the final curve and makes the optimal pressure interval describe the real change as much as possible.

In some embodiments of the present disclosure, the suitable pressure interval is set, which ensures the accuracy of the retrograde condensation damage degree curve, reduces the count of experiments, and avoids resource and time consumption.

In S2, evacuating the long rock core in the long rock core holder.

In some embodiments, the operation S2 includes: loading a long rock core after arrangement and combination into the long rock core holder 1, connecting a pipeline, opening the first two-way valve 21, applying a confining pressure of 700 psi to the long rock core through the confining pressure pump 3, in response to a pressure of the confining pressure gauge 4 being stable, opening a valve b of the third three-way valve 22, and evacuating the long rock core though the vacuum pump 5, or in response to the pressure of the vacuum pump 5 showing a negative value, closing the valve b of the third three-way valve 22, turning off the vacuum pump 5, and stopping evacuating. More descriptions regarding the long rock core holder 1 and the confining pressure may be found in FIG. 1 relevant descriptions thereof.

In S3, obtaining a first test long rock core by establishing an original formation irreducible water saturation, an original formation pressure condition, and an original formation temperature condition in the long rock core after evacuation.

The original formation irreducible water saturation refers to a proportion of water contained in pores or fissures of a subsurface rock layer where the long rock core is located. The original formation pressure condition refers to a pressure condition exerted on the subsurface rock layer where the long rock core is located. The original formation temperature condition refers to a temperature condition of the subsurface rock layer where the long rock core is located. The original formation irreducible water saturation, the original formation pressure condition, and the original formation temperature condition simulate the environmental condition when the long rock core is located in the formation.

In some embodiments, the operation S3 includes operations S31 to S32. In S31, establishing the irreducible water saturation by opening the third single-way valve 25, opening the second three-way valve 29 and the third three-way valve 22 sequentially, and displacing formation water in the first intermediate container connected to a valve c of the six-way valve 18 at a displacement speed of 0.1 mL/min-0.2 mL/min into the long rock core through the high-pressure high-precision displacement pump 6 connected to a valve d of the six-way valve 18 to saturate pores of the long rock core with the formation water; in response to a pressure reading of the outlet pressure gauge 8 starting to increase, turning off the high-pressure high-precision displacement pump 6, wherein the long rock core is completely saturated with the formation water; closing a valve a of the third three-way valve 22; applying a pressure of 100-200 psi to the back pressure valve 10 through the displacement pump 9, and controlling a pressure of helium in the second intermediate container 12 connected to a valve b of the six-way valve 18 through the high-pressure high-precision displacement pump 6 to make the pressure of helium constantly higher than a back pressure by 100 psi; and opening the second single-way valve 24, opening a valve b of the first three-way valve 28, a valve a of the second three-way valve 29, and the valve a the third three-way valve 22, sequentially and displacing the formation water with helium until no more formation water is produced from the test tube 14.

For example, the irreducible water saturation may be calculated through equation (2).

$$S_{wc} = \left(1 - \frac{m_w}{\Delta V_w \rho_w}\right) \times 100\% \quad (2)$$

where $S_{wc}$ denotes the irreducible water saturation of the long rock core; $m_w$ denotes a mass of movable formation water collected from the test tube 14 at the outlet end and displaced from the long rock core in g; $\Delta V_w$ denotes a cumulative displacement volume of the displacement pump 9 from the beginning of saturation of the formation water in the long rock core to end of complete saturation of the formation water in the long rock core in mL; and $p_w$ denotes a density of the formation water in g/cm³.

In S32, establishing the original formation pressure condition and the original formation temperature condition by increasing the confining pressure and the back pressure through the confining pressure pump 3 and the displacement pump 9, respectively; injecting helium in the second intermediate container 12 into the long rock core through the high-pressure high-precision displacement pump 6 to increase a pore pressure of the long rock core until a pressure in the long rock core reaches a formation pressure; after the pressure building is completed, maintaining pressures of the high-pressure high-precision displacement pump 6, the confining pressure pump 3, and the displacement pump 9 constant; and increasing a temperature of the constant temperature oven 15 to the formation temperature and increasing a temperature of the constant temperature oven 20 to the formation temperature for more than 12 hours. The first test long rock core is obtained by the operations S31 and S32. In the pressure building process, the confining pressure is maintained higher than the pore pressure of the long rock core by 700 psi, and at the same time, the outlet pressure of the long rock core is maintained lower than the back pressure by 50 psi.

In some embodiments, based on the ideal gas equation of state PV=nRT (where V denotes a volume, n denotes an amount of material of gas, R denotes a gas constant, and T denotes a temperature), the pressure increases when the temperature increases under the condition of a constant volume. Therefore, after the original formation pressure condition is established, the pressure in the long rock core may change during the establishment of the original formation temperature condition, which has a certain effect on the original formation pressure condition.

In some embodiments, the processor is configured to establish the original formation pressure condition and the original formation temperature condition based on constant pressure control. The constant pressure control refers to that when the pressure and temperature increases synchronously, the original formation pressure condition may be achieved while the original formation temperature condition may be established through the constant pressure control.

In some embodiments, the processor is configured to control the high-pressure high-precision displacement pump 6 to displace an injected volume of helium in the second intermediate container 12 based on the current pressure of the long rock core and a temperature-rise phase of the constant temperature oven 15. In some embodiments, the temperature rise phase includes a temperature-rise start-up phase, a temperature-rise stabilization phase, and a temperature-rise near-target phase.

The exemplary constant pressure control includes the following operations. In S321, the processor determines a pressure in the long rock core before temperature rise based on a difference between the formation temperature and a current temperature, the high-pressure high-precision displacement pump 6 injects helium in the second intermediate container 12 into the long rock core, increases the pore pressure of the long rock core until the pressure in the long rock core reaches the pressure in the long rock core before temperature rise. In S322, in response to the temperature of the constant temperature oven 15 being in the temperature-rise start-up phase, a first helium injection volume is determined based on a magnitude of change in the pressure in the long rock core during the temperature-rise start-up phase. At the end of the temperature-rise start-up phase, the high-pressure high-precision displacement pump displaces the helium in the second intermediate container 12 into the long rock core based on the first helium injection volume. In S323, in response to the temperature of the constant temperature oven 15 being in the temperature-rise stabilization phase, a second helium injection volume is determined based on a magnitude of change in the pressure in the long rock core. In S323, in response to the temperature of the constant temperature oven 15 being in the temperature-rise near-target phase, a third helium injection volume is determined based on a difference between a current pressure in the long rock core and the formation pressure.

The pressure in the long rock core before temperature rise refers to a pressure that needs to reach in the long rock core during the pressure building before temperature rise. According to the ideal gas equation of state, during the pressure building before temperature rise, the pressure before temperature rise may need to be less than the formation pressure; and after temperature rise is completed, the pressure in the long rock core needs to reach the formation pressure.

The temperature-rise start-up phase refers to a phase in which the temperature rises slowly when the constant temperature oven 15 begins to preheat. At this phase, it takes some time for the temperature of the constant temperature oven 15 to rise, air inside the constant temperature oven 15 and a housing of the valve or the pipeline also absorb some heat, which results in heat loss. Therefore, the temperature of the long rock core inside the constant temperature oven 15 rises slowly. In some embodiments, in the temperature-rise start-up phase, the temperature rises slowly. At the end of the temperature-rise start-up phase, the high-pressure high-precision displacement pump displaces helium in the second intermediate container 12 to the long rock core, which may effectively control the pressure in the long rock core.

The temperature-rise stabilization phase refers to a phase in which the temperature rises significantly in the preheating process of the constant temperature oven 15. In this phase, the temperature of the constant temperature oven 15 and the air temperature reach a certain level, the heat transferred to the long rock core is no longer absorbed by the housing, air, etc., and the temperature rises relatively fast and stabilizes. In some embodiments, in the temperature-rise stabilization phase, the high-pressure high-precision displacement pump 6 may displace helium in the second intermediate container 12 to the long rock core based on an equidistant moment. For example, the high-pressure high-precision displacement pump 6 displaces the helium in the second intermediate container 12 to the long rock core at 30 min, 60 min, 90 min of the temperature-rise stabilization phase. In other embodiments, the high-pressure high-precision displacement pump 6 may displace the helium in the second intermediate container 12 to the long rock core at the end of the temperature-rise stabilization phase.

The temperature-rise near-target phase refers to a phase where a difference between the current temperature of the constant temperature oven 15 and a target temperature is smaller than a temperature difference threshold, and the current temperature of the constant temperature oven 15 approaches the formation temperature. In some embodiments, in the temperature-rise near-target phase, the high-pressure high-precision displacement pump 6 displaces helium in the second intermediate container 12 to the long rock core in synchronization with the temperature rise of the constant temperature oven 15. In some embodiments, the temperature difference threshold is related to a heating power of the constant temperature oven 15. The greater the heating power of the constant temperature oven 15, the greater the temperature difference threshold. In some embodiments, the processor may determine the temperature difference threshold by looking up a table based on the heating power of the constant temperature oven 15.

In some embodiments, the processor may classify the temperature-rise phase into the temperature-rise start-up phase and the temperature-rise stabilization phase by calculating a derivative of each numerical point on a temperature change curve. For example, a derivative threshold may be preset. When the constant temperature oven 15 starts to heat, and if the derivative of each numerical point on the temperature change curve is smaller than the derivative threshold, a phase of each numerical point belongs to the temperature-rise start-up phase, and if the derivative of each numerical point on the temperature change curve is greater than the derivative threshold, a phase of each numerical point belongs to the temperature-rise stabilization phase.

In some embodiments, the processor may determine the first helium injection volume in various ways. In some embodiments, the process determining the first helium injection volume includes: matching a temperature change curve in the temperature-rise start-up phase with a reference change curve in a temperature database; in response to a matching similarity is greater than a threshold, selecting a reference pressure change magnitude of the reference change curve in the temperature database as a current pressure change magnitude; and determining the first helium injection volume by looking up a table based on the pressure change magnitude and the pressure in the long rock core before the temperature rise. In some embodiments, the temperature database related to the pressure change in the long rock core is established based on the temperature change curve in the temperature-rise start-up phase in historical data.

In some embodiments, the temperature in the temperature-rise stabilization phase rises relatively fast and tends to be steady, and the temperature change is linear with time. In some embodiments, the processor may determine the second helium injection volume in various ways. For example, the processor may construct a vector to be matched based on the heating power, the temperature change magnitude, and the pressure in the long rock core in the temperature-rise stabilization phase and determine a recommended second helium injection volume based on a retrieved result of the vector to be matched in a vector database. The vector database includes a plurality of reference vectors and the second helium injection volume corresponding to each reference vector. The reference vectors are constructed based on the heating power, the temperature change magnitude, and the pressure in the long rock core in the temperature-rise stabilization phase in historical data. The processor may select a second helium injection volume corresponding to a reference vector with a smallest vector distance as the recommended second helium injection volume by calculating vector distances between the vector to be matched and the reference vectors.

In some embodiments, the processor determines the third helium injection volume based on a difference between the pressure in the long rock core and the formation pressure in the temperature-rise stabilization phase by querying the pressure change corresponding to a volume of helium injected into the long rock core in the temperature-rise stabilization phase. In some embodiments, the processor may determine the third helium injection volume based on a preset equation. The exemplary preset equation is: the third helium injection volume=(formation pressure−pressure in the long rock core in the temperature-rise stabilization phase)/helium pressure change volume, where the helium pressure change volume may be determined by the helium pressure change corresponding to the volume of helium injected into the long rock core in the temperature-rise stabilization phase. For example, the helium pressure change volume=pressure increase amount/the helium injection volume, where the pressure increase amount and the helium injection volume may be obtained from the helium pressure measurement data in the temperature-rise stabilization phase and the data of the high-pressure high-precision displacement pump 6.

The constant pressure control method shown in some embodiments of the present disclosure may accurately control the pressure in the long rock core and ensure that the pressure in the long rock core is equal to or close to the formation pressure after the temperature is increased, which helps to well establish the original formation pressure condition and the original formation temperature condition.

In S4, obtaining a first permeability result by testing a permeability of the first test long rock core.

In some embodiments, the first permeability result is obtained by displacing helium in the second intermediate container 12 at a constant pressure using the high-pressure high-precision displacement pump 6, after representation numbers of the inlet pressure gauge 13, the confining pressure gauge 4, and the outlet pressure gauge 8 are stable, and a flow rate of the gas flowmeter 16 is stable, recording the inlet pressure $P_{inj}$, the outlet pressure $P_{out}$, and the outlet flow rate $Q_T$, and calculating a gasometric permeability $K_0$ at the original formation temperature and pressure through equation (4). See below for the equation (4).

In S5, obtaining a second test long rock core by establishing an original formation fluid condition in the first test long rock core.

In some embodiments, the second test long rock core is obtained by establishing the original formation fluid condition in the first test long rock core by driving condensate gas in the sample preparation device 19 connected to the valve a of the six-way valve 18 into the long rock core holder 1 at a rate of 0.2 mL/min through the high-pressure high-precision displacement pump 6, displacing helium in the long rock core, establishing an original formation fluid state, and when a gas-oil ratio tested at the outlet end of the long rock core holder 1 reaches a prepared condensate gas-oil ratio, testing collected natural gas composition through the gas chromatograph 17, and when the natural gas composition reaches preset natural gas composition, increasing a pressure of the back pressure valve 10 through the displacement pump 9 until no more fluid is produced at the outlet end.

The original formation fluid state refers to a state such as phase or viscosity of the fluid in the subsurface rock layer in which the long rock core is located after being influenced by the pressure and temperature of the original formation. The gas-oil ratio refers to a ratio relationship between natural gas per unit volume and crude oil per unit volume.

In S6, a second permeability result is obtained by testing, based on the experimental pressure point, a permeability change of the second test long rock core at different depletion pressure points.

In some embodiments, the obtaining a second permeability result by testing, based on the experimental pressure points, a permeability change of the second test long rock core at different depletion pressure points may include operations S61-S63.

In S61, de-pumping at a pumping speed of 0.5 mL/min through the displacement pump 9 according to the experimental pressure points, controlling the pressure of the back pressure valve 10 to reduce to a first permeability testing experimental pressure point, controlling the confining pressure to be always higher than a pressure of the long rock core by 700 psi through the confining pressure 3 and controlling a pressure of the sample preparation device 19 and a pressure of the second intermediate container to reduce to the experimental pressure in the pressure reduction process, when the pressure of the second test long rock core is exhausted to a target experimental pressure value, and pressure presentation numbers of the outlet pressure gauge 8, the inlet pressure gauge 13, and the back pressure gauge are stable, driving helium in the second intermediate container 12 into the long rock core at a preset speed through the high-pressure high-precision displacement pump 6, and displacing the condensate gas at a same temperature and pressure with the helium until all the condensate gas is completely displaced.

In some embodiments, the high-pressure high-precision displacement pump 6 displaces the helium in the second intermediate container 12 into the long rock core at a displacement speed of $Q_b$=0.1 mL/min-0.2 mL/min. In some embodiments, when the displacement time exceeds Equation (3), it indicates that 1.2 times the effective pore volume has been sufficiently displaced and a large amount of the condensate gas has been displaced.

$$t = 1.2 \frac{m_w/\rho_w}{Q_b} \qquad (3)$$

where t denotes the displacement time; $Q_b$ denotes the displacement speed; $m_w$ denotes the mass of movable formation water collected in the test tube 14 at the outlet end and displaced from the long rock core; and $\rho_w$ denotes the density of the formation water.

In S62, obtaining the second permeability result by testing, after the displacement time reaches a preset time, gas composition at the outlet end of the long rock core holder 1 every 20 min until the gas composition tested by the gas chromatograph 17 is all helium and the flow rate of the gas flowmeter 16 is stable, recording the inlet pressure, outlet pressure, and outlet flow rate, and calculating the permeability at the pressures through equation (4).

$$K_{gi} = \frac{2P_{sc} Q_T \bar{\mu}_{He} L}{A(P_{inj}^2 - P_{out}^2)} \times 100 \qquad (4)$$

where $K_{gi}$ denotes the gas permeability of an $i^{th}$ depressurization test in mD; $P_{inj}$ denotes the inlet pressure; $P_{out}$ denotes the outlet pressure; A denotes a cross-sectional area of the long rock core in cm$^2$; $P_{sc}$ denotes an atmospheric pressure in MPa; $Q_T$ denotes the flow rate of helium at a formation temperature of T at the atmospheric pressure in mL/s; $\bar{\mu}_{He}$ denotes the viscosity of helium at a pressure of $(P_{inj}+P_{out})/2$ of the long rock core at the formation temperature of T in mPa·s, $\bar{\mu}_{He}$ may be obtained by querying the National Institute of Standards and Technology (NIST) chemical database for the viscosity of helium at different temperatures and pressures; and L denotes a length of the long rock core in cm.

In some embodiments, a test time interval for testing the gas composition at the outlet end of the long rock core holder 1 in S62 may be adjusted. In some embodiments, the processor is configured to determine the test time interval. In some embodiments, the processor is configured to determine the test time interval based on a preset time interval. In some embodiments, an operator may obtain the preset time interval by presetting through an interactive terminal or adjusting based on historical data. The processor takes the preset time interval as the test time interval for conducting the experiment. In some embodiments, the test time interval may be the same intervals or shortened from longer intervals to shorter intervals. For example, the test time interval is sequentially 40 min, 30 min, and 20 min. As another example, the test time interval is sequentially 40 min, 30 min, and 25 min. In some embodiments, the processor is configured to adjust the test time interval based on a preset interval parameter. The interval parameter refers to a parameter of the test time interval. For example, the preset interval parameter is that from a time when the displacement time reaches the preset time, the test time interval is set as 20 min within 0~40 min; the test time interval is set as 15 min within 40 min~60 min; the test time interval is set as 10 min within 0~80 min; the test time interval is set as 5 min within 80 min~100 min, etc.

In some embodiments, the processor is configured to determine the interval parameter based on the displacement speed of the high-pressure high-precision displacement pump 6, the current pressure in the long rock core, and the porosity. In some embodiments, the processor predicts a current displacement completion time based on the current displacement speed of the high-pressure high-precision displacement pump 6, the current pressure in the long rock core, and the porosity through a completion time prediction algorithm and determines the interval parameter based on the current predicted displacement completion time. In some embodiments, the processor may obtain the displacement speed of the high-pressure high-precision displacement pump 6 by obtaining an operating parameter of the high-pressure high-precision displacement pump 6 and obtains the current pressure in the long rock core by obtaining a measurement value of the back pressure gauge. The porosity may be obtained from the long rock core structure data. More descriptions regarding the long rock core structure data may be found above.

In some embodiments, the completion time prediction algorithm includes establishing a relationship function based on a historical displacement speed of the high-pressure high-precision displacement pump 6, a historical pressure in the long rock core, a historical porosity, and a historical displacement completion time through data fitting. The displacement completion time refers to a time from the start of the displacement to a time when the outlet is filled with helium. Exemplarily, the completion time prediction algorithm is, where y denotes the displacement completion time, x1 denotes the displacement speed, x2 denotes the pressure in the long rock core, and x3 denotes the porosity; and a, b, and c denote weights of data fitting.

In some embodiments, the processor may determine the interval parameter by looking up a table based on the current predicted displacement completion time. In some embodiments, the current predicted displacement completion time is positively correlated with the interval parameter. The longer the predicted completion time, the longer the interval of the interval parameter. The interval of the interval parameter may indicate a magnitude of shortening of the test time interval. It is understood that the longer the interval of the interval parameter, the faster the test time interval is shortened. In some embodiments, the interval of the interval parameter may be fixed or unfixed. For example, when the parameter interval is unfixed and is 10 min, 5 min, and 2 min, the test time intervals are sequentially 40 min, 30 min, 25 min, and 23 min.

In some embodiments, the processor may predict the current displacement completion time through a clustering algorithm (e.g., Kmeans clustering). For example, the processor may obtain at least one cluster by clustering each historical displacement speed, historical pressure in the long rock core, and historical porosity based on historical experiments. The historical experiments include multiple pieces of historical data, and each piece of historical data includes the historical displacement speed, the historical pressure in the long rock core, the historical porosity, and the corresponding displacement completion time. The processor may calculate a distance between the current displacement speed, the long rock core pressure, and the porosity and the at least one cluster and take an average of the completion times corresponding to a cluster closest to the current displacement speed, pressure in the long rock core, and porosity as the predicted current displacement completion time. In this regard, the distance between the current displacement speed, the pressure in the long rock core, and the porosity and the at least one cluster may be a distance between the current displacement speed, the pressure in the long rock core, and the porosity and a cluster center.

In some embodiments of the present disclosure, at the beginning of the displacement, the gas composition at the outlet end of the long rock core holder 1 is mostly the condensate gas. As the helium is used to displace the condensate gas, the condensate gas gradually decreases and the helium gradually increases at the outlet end until the discharged gas is entirely composed of helium. The test time interval is adjusted, which makes it possible to determine when the gas composition is entirely helium accurately and reduces the waste of experimental resources.

In S63, when the permeability testing under the first permeability testing pressure point is completed, displacing helium by displacing equilibrium condensate gas in the sample preparation device 19 at a corresponding temperature and pressure through the high-pressure high-precision displacement pump 6 at a displacement speed of 0.1 mL/min~0.2 mL/min until there is no helium in the gas composition at the outlet end tested by the gas chromatograph 17.

In S7, obtaining a third test long rock core by recovering a condensate gas reservoir fluid of the second test long rock core.

In some embodiments, the third test long rock core is obtained by displacing the helium with the equilibrium condensate gas in the sample preparation device 19 at the corresponding temperature and pressure through the high-pressure high-precision displacement pump 6 at a displacement speed of 0.1 mL/min~0.2 mL/min until there is no helium in the gas composition tested by the gas chromatograph 17, and recovering the condensate gas reservoir fluid at the test point pressure.

In S8, obtaining a third permeability result by testing a permeability change of the third test long rock core and plotting a permeability damage degree curve.

In some embodiments, the obtaining a third permeability result by testing a permeability change of the third test long rock core and plotting a permeability damage degree curve includes operations S81-S82.

In S81, obtaining the third permeability result by reducing the back pressure to a next test pressure point of the experimental pressure point and repeating the operation S6 to test a permeability change of the next test pressure point after the back pressure is stable.

In S82, calculating permeability damage degrees at different pressures based on the first permeability result, the second permeability result, and the third permeability result and plotting the permeability damage degree curve.

In some embodiments, the permeability damage degrees at different pressures may be calculated through equation (5).

$$h = \frac{K_0 - K_{gi}}{K_0} \quad (5)$$

where h denotes the permeability damage degree; $K_{gi}$ denotes a gas permeability of an $i^{th}$ depressurization test; and $K_{gi}$ denotes the gasometric permeability under the irreducible water saturation.

Equations (1) to (5) above are merely for the purpose of illustration and do not limit the calculation manners. Other similar manners based on the gas permeability may also be applied in this embodiment, for example, when the long rock core is flat or in a different shape, equation (4) above may be adjusted to calculate based on the specific shape.

In some embodiments of the present disclosure, the permeability damage degree curve is obtained through the method for testing retrograde condensation damage, which accurately evaluates the permeability damage of the condensate gas reservoir and provides an important reference for the efficient development of the condensate gas fields.

It should be noted that the above description of the process for testing the retrograde condensation damage is merely for the purpose of illustration and does not limit the scope of the present disclosure. For those skilled in the art, various modifications and changes may be made to the process for testing the retrograde condensation damage under the guidance of the present disclosure. However, these modifications and changes are still within the scope of the present disclosure. For example, the order in which the original formation irreducible water saturation, the original formation pressure condition, and the original formation temperature condition are established may be changed.

The device and the method for testing retrograde condensation damage in a near well zone of a condensate gas reservoir with high condensate content is further illustrated through specific embodiments of the present disclosure.

Taking a certain condensate gas reservoir as an example, the condensate gas reservoir is located in a formation with a pressure Pe of 26 MPa, a temperature of 89° C., the saturation pressure Pβ of 23 MPa, and exhausted the exhaust pressure Pa of 4 MPa. A condensate gas-oil ratio is 960 m³/m³. The length L of the experimentally prepared long rock core is 50 cm.

In Step 1, calculating the pressure points to be set for the experiment. The count of the pressure points is determined according to equation 1. According to the calculation of Equation 1, if n=6, and the count of 6 pressure points are needed. The pressure points were 20 MPa, 17 MPa, 14 MPa, 11 MPa, 8 MPa, and 4 MPa, respectively.

In Step 2, evacuating the long rock core. First, the confining pressure of 700 psi was applied to the assembled long rock core holder 1 through the confining pressure pump 3, and the long rock core holder 1 was evacuated through the vacuum pump 5 for 12 hours until the pressure gauge of the vacuum pump 5 shows a negative value. After evacuation, the valve b of the third three-way valve 22 was closed.

In Step 3, establishing the original formation irreducible water saturation. First, the third single-way valve 25 was opened, the second three-way valve 29 and the third three-way valve 22 were opened sequentially, and the formation water in the first intermediate container 7 connected to the valve c of the six-way valve 18 was displaced at a pumping speed of 0.1 mL/min into the long rock core through the high-pressure high-precision displacement pump 6 connected to the valve d of the six-way valve 18 to fully saturate the long rock core with the formation water. When the pressure reading of the outlet pressure gauge 8 starts to increase, the high-pressure high-precision displacement pump 6 was turned off, and the valve a of the third three-way valve 22 was closed. A pressure of 100-200 psi was applied to the back pressure valve 10 through the displacement pump 9, the pressure of helium in the second intermediate container 12 was made constantly higher than the back pressure by 100 psi through the high-pressure high-precision displacement pump 6, the second single-way valve 24 was opened, the valve b of the first three-way valve 28, the valve a of the second three-way valve 29, and the valve a of the third three-way valve 22 were sequentially opened, and the formation water was displaced through the helium until no more formation water is produced from the test tube 14 at the outlet end, which indicated that all movable water was displaced. At this point, the irreducible water saturation was established. According to the calculation equation (2) of the irreducible water saturation, the irreducible water saturation was calculated to be 41%.

In Step 4, establishing the original formation temperature condition and the original formation pressure condition. First, the confining pressure and the back pressure were increased through the confining pressure pump 3 and the displacement pump 9, respectively, and helium in the second intermediate container 12 was injected into the long rock core through the high-pressure high-precision displacement pump 6 to increase the pore pressure until the pressure in the long rock core reached 26 MPa. During the pressure building, the pressure was applied by the confining pressure pump 3 to maintain the confining pressure higher than the pore pressure of the long rock core by 700 psi. At the same time, the pressure was applied by the high-pressure high-precision displacement pump 6 to maintain the outlet pressure of the long rock core lower than the back pressure by 50 psi. After the pressure building is completed, the pressures of the high-pressure high-precision displacement pump 6, the confining pressure pump 3, and the displacement pump 9 were maintained constant, and the temperature of the constant temperature oven 15 was increased to 89° C. Simultaneously, the temperature of the thermostatic chamber 20 was also increased to 89° C. for more than 12 hours.

In Step 5, testing the permeability under the irreducible water saturation and establishing the original formation fluid condition. When the pressure and temperature of the long rock core in the constant temperature oven 15 were stabilized at 26 MPa and 89° C., the helium in the second intermediate container 12 was displaced using the high-pressure high-precision displacement pump 6 at the constant pressure. After the representation numbers of the pressure gauges were stable and the flow rate of the gas flowmeter 16 was also stable, the inlet pressure Pinj, the outlet pressure Pout, and the outlet flow rate QT were recorded. The gasometric permeability under the irreducible water saturation was calculated through the equation (4) $K_0$=6.28 m D. The condensate gas in the sample preparation device 19 was drived into the long rock core holder 1 at a rate of 0.2 mL/min through the high-pressure high-precision displacement pump 6 to displace the helium in the long rock core, and the fluid state was established at the original formation temperature condition and pressure. When the gas-oil ratio tested at the outlet end reached 960 m³/m³, the composition of the collected natural gas was tested through the gas chromatograph 17. When the composition of the natural gas was similar to the composition of the natural gas of the original condensate gas that is flashed to the ground, the original formation fluid state in the long rock core was established. The composition of the natural gas at the original ground surface and the composition of the natural gas chromatographed at the outlet end of the experiment are shown in Table 1.

Table 1. Composition of the original flash gas and composition of tested gas at the outlet end of the experiment It may be seen that the composition of the chromatographically tested gas at the outlet end is basically consistent with the original ground flash gas, which indicates that the original formation fluid state in the long rock core was established.

In Step 6, testing the permeability change at the different depletion pressure points. The pressure of the back pressure valve 10 was controlled to reduce to the first pressure point test point of 20 MPa at a speed of 0.5 mL though the displacement pump 9 and the measurement of the confining pressure gauge 4 was controlled to be lower than the measurement of the inlet pressure gauge 13 by 700 psi through the confining pressure pump 3. Simultaneously, the pressure of the sample preparation device 19 and the pressure of the second intermediate container 12 were reduced to the same pressure. When the representation numbers of pressure gauges were stable, the second intermediate container 12 was opened, and helium was displaced into the long rock core at a rate of 0.1 mL/min until the chromatographically tested gas at the outlet end was all helium. After the pressure of the inlet pressure gauge 13, the pressure of the outlet pressure gauge 8, and the confining pressure were stable, and the flow rate of the gas flowmeter 16 was stable, the inlet pressure Pinj, the outlet pressure Pout, and the gas flow rate QT were recorded. The gas permeability at this pressure was calculated to be 5.85 mD through equation (4).

In Step 7, obtaining the gas permeabilities at different pressures by decreasing the pressure sequentially and repeating Step 6. The corresponding permeabilities were calculated to be 4.36 mD, 3.52 mD, 2.81 mD, 3.12 mD, and 3.31 mD at 17 MPa, 14 MPa, 11 MPa, 8 MPa, and 4 MPa, respectively.

Figure 3:
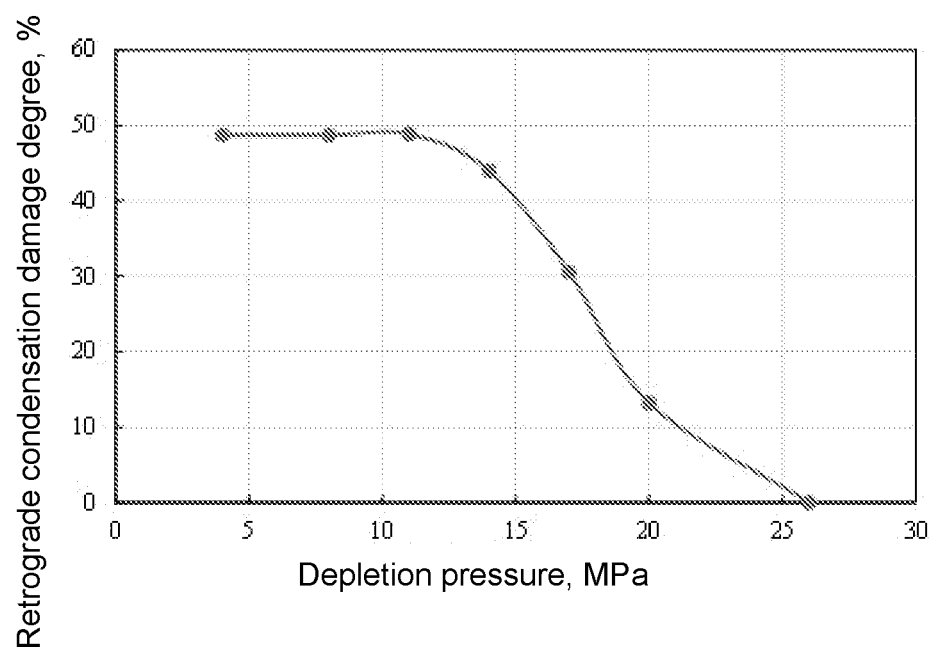
FIG. 3 is an exemplary graph of a permeability damage degree curve according to some embodiments of the present disclosure; and In the figures, 1—a long rock core holder, 3—a confining pressure pump, 4—a confining pressure gauge, 5—a vacuum pump, 6—a high-pressure high-precision displacement pump, 7—a first intermediate container, 8—an outlet pressure gauge, 9—a displacement pump, 10—a back pressure valve, 11—a gas meter, 12—a second intermediate container, 13—an inlet pressure gauge, 14—a test tube, 15—a constant temperature oven, 16—a gas flowmeter, 17—a gas chromatograph, 18—a six-way valve, 19—a sample preparation device, 20—a thermostatic chamber, 21—a first two-way valve, 22—a third three-way valve, 23—a first single-way valve, 24—a second single-way valve, 25—a third single-way valve, 26—a fourth single-way valve, 27—a second two-way valve, 28—a first three-way valve, and 29—a second three-way valve.

In Step 8, finally, calculating the permeability damage degree at each pressure through equation (5) and plotting the retrograde condensation damage degree curve (as shown in FIG. 3) during the depletion development of the condensate gas reservoir. FIG. 3 is an exemplary graph of a permeability damage degree curve according to some embodiments of the present disclosure. According to the FIG. 3, a retrograde condensation damage degree reaches 48.9% when the depletion pressure of the condensate gas reservoir reaches 11 MPa. Therefore, measures need to be taken to reduce or alleviate the damage caused by retrograde condensate in the development process of the condensate gas reservoir.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, some features, structures, or features in the present disclosure of one or more embodiments may be appropriately combined.

In addition, those skilled in the art will understand that various aspects of the present disclosure may be illustrated and described in several patentable categories or situations, including any new and useful process, machine, product, or combination of substances, or any new and useful improvements thereto. Accordingly, all aspects of the present disclosure may be performed entirely by hardware, may be performed entirely by software (including firmware, resident software, microcode, etc.), or may be performed by a combination of hardware and software. The above hardware or software can be referred to as "data block," "module," "engine," "unit," "component," or "system." In addition, aspects of the present disclosure may be presented as a computer product located in one or more computer-readable mediums, the product including computer-readable program code.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A device for testing retrograde condensation damage in a near well zone of a condensate gas reservoir with a high condensate content, comprising: a long rock core holder, a first two-way valve, a second two-way valve, a first single-way valve, a second single-way valve, a third single-way valve, a fourth single-way valve, a first three-way valve, a second three-way valve, a third three-way valve, a confining pressure pump, a confining pressure gauge, a vacuum pump, a high-pressure high-precision displacement pump, a first intermediate container, an outlet pressure gauge, a displacement pump, a back pressure valve, a gas meter, a second intermediate container, an inlet pressure gauge, a test tube, a constant temperature oven, a gas flowmeter, a gas chromatograph, a six-way valve, a sample preparation device, and a thermostatic chamber, wherein the high-pressure high-precision displacement pump, the sample preparation device, the second intermediate container, and the first intermediate container are all connected to the six-way valve; the second intermediate container, the first intermediate container, and the six-way valve are located inside the constant temperature oven; the third three-way valve is connected to the long rock core holder; the first single-way valve is connected to the sample preparation device and is also connected to the third three-way valve through the first three-way valve and the second three-way valve; the second single-way valve is connected to the second intermediate container and is also connected to the third three-way valve through the first three-way valve and the second three-way valve; the third single-way valve is connected to the first intermediate container and is also connected to the third three-way valve through the second three-way valve; the inlet pressure gauge, the confining pressure gauge, the outlet pressure gauge, the first two-way valve, and the fourth single-way valve are all connected to the long rock core holder and are located inside the constant temperature oven; the vacuum pump is connected to the third three-way valve and is located outside the constant temperature oven; the confining pressure pump is connected to the first two-way valve and is located outside the constant temperature oven; the back pressure valve, the gas flowmeter, and the test tube are connected in sequence and are all located inside the thermostatic chamber; the back pressure valve is connected to the fourth single-way valve; the second two-way valve is connected to the back pressure valve and is located inside the thermostatic chamber; the displacement pump is connected to the second two-way valve and is located outside the thermostatic chamber; the gas meter is connected to the test tube and is located outside the thermostatic chamber; and the gas chromatograph is connected to the gas meter and is located outside the thermostatic chamber.

2. A method for testing retrograde condensation damage in a near well zone of a condensate gas reservoir with a high condensate content, wherein the method is implemented by the device for testing retrograde condensation damage in the near well zone of the condensate gas reservoir with the high condensate content of claim 1, and the method comprises:

S1, developing pressure points of different permeability testing experiments;

S2, evacuating a long rock core in the long rock core holder;

S3, obtaining a first test long rock core by establishing an original formation irreducible water saturation, an original formation pressure condition, and an original formation temperature condition in the long rock core after evacuation;

S4, obtaining a first permeability result by testing a permeability of the first test long rock core;

S5, obtaining a second test long rock core by establishing an original formation fluid condition in the first test long rock core;

S6, obtaining a second permeability result by testing, based on the pressure points, a permeability change of the second test long rock core at different depletion pressure points;

S7, obtaining a third test long rock core by recovering a condensate gas reservoir fluid of the second test long rock core; and S8, obtaining a third permeability result by testing a permeability change of the third test long rock core and plotting a permeability damage degree curve.

3. The method of claim 2, wherein the S2 includes: loading the long rock core after arrangement and combination into the long rock core holder, connecting a pipeline, opening the first two-way valve, applying a confining pressure of 700 psi to the long rock core through the confining pressure pump, in response to a pressure of the confining pressure gauge being stable, opening the third three-way valve and evacuating the long rock cores through the vacuum pump, or in response to the pressure of the vacuum pump showing a negative value, closing the second two-way valve, turning off the vacuum pump, and stopping evacuating.

4. The method of claim 3, wherein the S3 includes:

S31, establishing the original formation irreducible water saturation by displacing formation water in the first intermediate container connected to a valve c of the six-way valve at a pumping rate of 0.1 mL/min-0.2 mL/min into the long rock core through the high-pressure high-precision displacement pump connected to a valve d of the six-way valve to saturate pores of the long rock core with the formation water; in response to a pressure reading of the outlet pressure gauge starting to increase, turning off the high-pressure high-precision displacement pump, wherein the long rock core is completely saturated with formation water; closing the third three-way valve, applying a pressure of 100 psi-200 psi to the back pressure valve through the displacement pump, and controlling a pressure of helium in the second intermediate container through the high-pressure high-precision displacement pump to make the pressure of helium constantly higher than a back pressure by 100 psi; connecting the second intermediate container to a valve b of the six-way valve; and opening the second single-way valve, the first three-way valve, the second three-way valve, and the third three-way valve in turn and displacing the formation water through the helium until no more formation water is produced from the test tube; and S32, establishing the original formation pressure condition and the original formation temperature condition by increasing the confining pressure and the back pressure through the confining pressure pump and the displacement pump, respectively; injecting helium in the second intermediate container into the long rock core through the high-pressure high-precision displacement pump to increase a pore pressure until a pressure in the long rock core reaches a formation pressure; maintaining the confining pressure higher than an inlet pressure by 700 psi during pressure building; after the pressure building is complete, maintaining pressures of the high-pressure high-precision displacement pump, the confining pressure pump, and the displacement pump constant and increasing a temperature of the constant temperature oven to a formation temperature; and increasing a temperature of the thermostatic chamber to the formation temperature for more than 12 h; and obtaining the first test long rock core.

5. The method of claim 4, wherein the S4 includes:
obtaining the first permeability result by displacing helium in the second intermediate container at a constant pressure using the high-pressure high-precision displacement pump, after representation numbers of the inlet pressure gauge, the confining pressure gauge, and the outlet pressure gauge are stable, and a flow rate of the gas flowmeter is stable, recording a first inlet pressure, a first outlet pressure, and a first outlet flow rate, and calculating a gasometric permeability under the irreducible water saturation using an equation.

6. The method of claim 5, wherein the S5 includes:
obtaining the second test long rock core by establishing the original formation fluid condition in the first test long rock core by driving condensate gas in the sample preparation device into the long rock core holder at a rate of 0.2 mL/min through the high-pressure high-precision displacement pump, displacing helium in the first test long rock core, establishing an original formation fluid state, when a gas-oil ratio tested at an outlet end of the long rock core holder reaches a prepared condensate gas-oil ratio, testing collected natural gas composition through the gas chromatograph, and when the tested natural gas composition is similar to original flash gas composition, increasing a pressure of the back pressure valve through the displacement pump until no more fluid is produced at the outlet end.

7. The method of claim 6, wherein the S6 includes:
S61, de-pumping at a pump speed of 0.5 mL/min through the displacement pump according to the pressure points, controlling the pressure of the back pressure valve to reduce to a first permeability testing pressure point, controlling the confining pressure to be higher than a pressure of the second test long rock core by 700 psi through the confining pressure pump and controlling a pressure of the sample preparation device and a pressure of the second intermediate container to reduce to the test pressure point in the pressure reduction process, when the pressure of the second test long rock core is exhausted to a specified pressure value and pressure presentation numbers of the outlet pressure gauge, the inlet pressure gauge, and the back pressure gauge are stable, driving helium in the second intermediate container into the second test long rock core at a preset speed through the high-pressure high-precision displacement pump, and displacing condensate gas at a same temperature and pressure with the helium;

S62, obtaining the second permeability result by testing, after a displacement time reaches a preset time, gas composition at the outlet end of the long rock core holder every 20 min until the gas composition tested by the gas chromatograph is all helium and the flow rate of the gas flowmeter is stable, recording a second inlet pressure, a second outlet pressure, and a second outlet flow rate, and calculating the permeability at the pressures; and S63, when the permeability testing under the first permeability testing pressure point is completed, displacing helium by displacing equilibrium condensate gas in the sample preparation device at a corresponding temperature and pressure through the high-pressure high-precision displacement pump at a displacement speed of 0.1 mL/min-0.2 mL/min until there is no helium in the gas composition at the outlet end tested by the gas chromatograph.

8. The method of claim 7, wherein the S7 includes:
obtaining the third test long rock core by displacing the helium with the equilibrium condensate gas in the sample preparation device at the corresponding temperature and pressure through the high-pressure high-precision displacement pump at the displacement speed of 0.1 mL/min~0.2 mL/min until there is no helium in the gas composition tested by the gas chromatograph and recovering the condensate gas reservoir fluid under the test pressure point.

9. The method of claim 8, wherein the S8 includes:
S81, obtaining the third permeability result by reducing the back pressure to a next test pressure point of the pressure point and repeating the S6 to test a permeability change of the next pressure point after the back pressure is stable; and S82, calculating permeability damage degrees at different pressures based on the first permeability result, the second permeability result, and the third permeability result and plotting the permeability damage degree curve.

* * * * *